July 28, 1942.   J. C. CLINEFELTER   2,291,212
EXTRUDING MACHINE
Filed Jan. 13, 1940   2 Sheets-Sheet 1
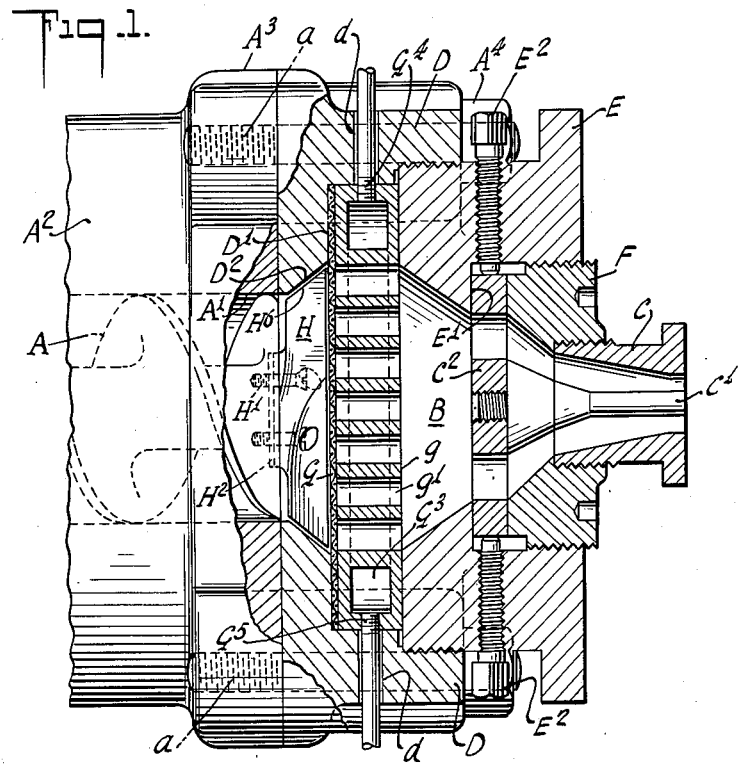
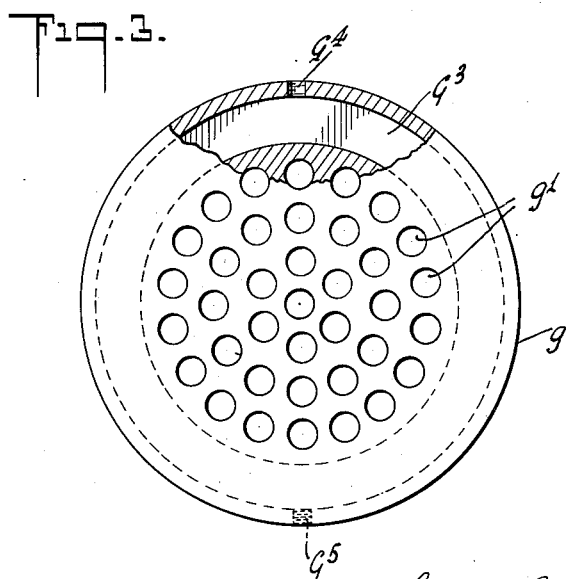
INVENTOR
James C. Clinefelter
BY
Morrison, Kennedy & Campbell
ATTORNEYS July 28, 1942.  J. C. CLINEFELTER  2,291,212
EXTRUDING MACHINE
Filed Jan. 13, 1940   2 Sheets-Sheet 2
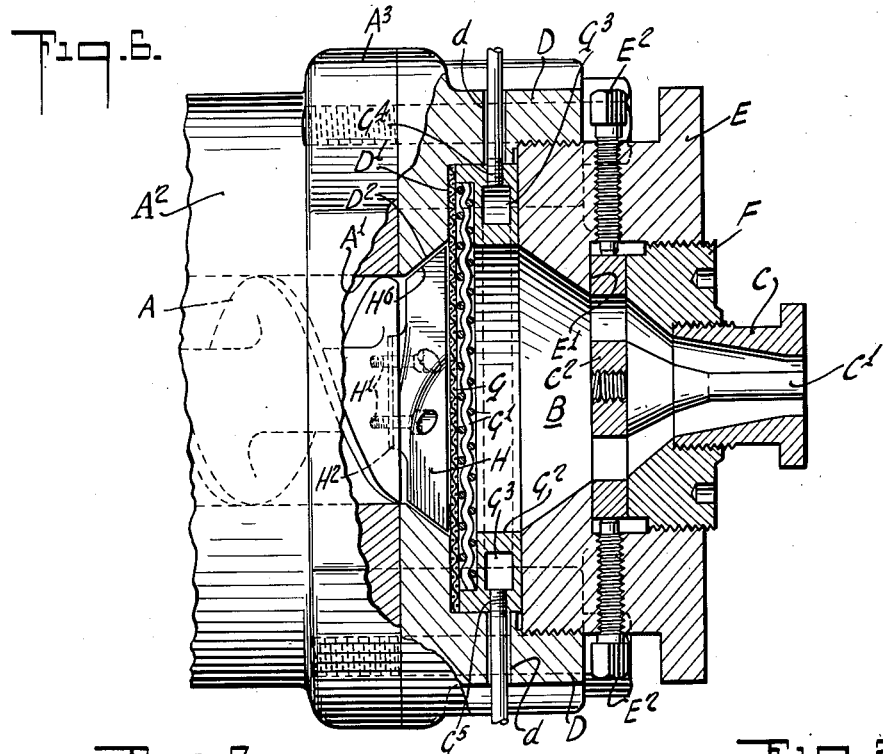
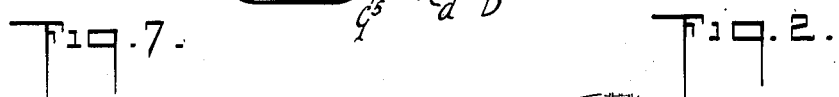
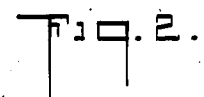
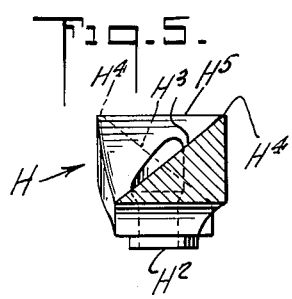
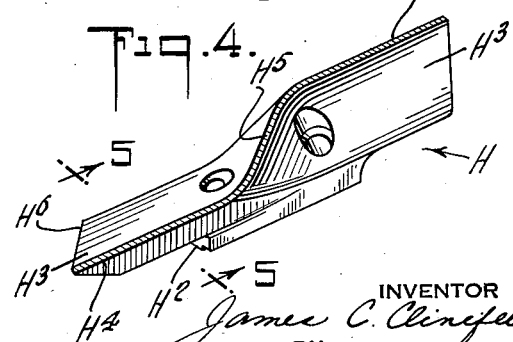

Patented July 28, 1942

2,291,212

UNITED STATES PATENT OFFICE 2,291,212

EXTRUDING MACHINE

James C. Clinefelter, Akron, Ohio

Application January 13, 1940, Serial No. 313,651

9 Claims. (Cl. 18—12)

This invention relates to extruding machines of the character wherein a plastic material is forced through a die to give form to the article being produced. Such machines are extensively used in the rubber industry in the manufacture of tires, tubes, mechanical rubber goods and other products.

In ordinary extruding machines, plastic material is conveyed by a screw to a chamber from which the material is extruded through the forming die. The cross-sectional area of the die aperture is smaller than the cross-sectional area of the chamber, the dimensions of the screw together with its speed of operation being such as to maintain the chamber filled with material at all times and to maintain also the necessary extruding pressure at the die.

If the screw referred to had merely a conveying function, i. e., if it did not have to serve the additional function of building up pressure for extrusion purposes, the total volumetric displacement of which it is capable could be realized. As the screw does have this latter function, however, and, since it is impositive in its action, slippage occurs between the material and the screw surfaces, producing friction with an accompanying generation of heat, the amount of heat developed depending, of course, on the material being conveyed and the pressure that must be built up to effect extrusion.

Where the material extruded is compounded rubber in its uncured or unvulcanized state, the heat developed has a tendency to produce what is known in the rubber art as scorching or burning. To prevent this, extruding machines have been water cooled, as by jacketing the chamber in which the screw operates and by water cooling the screw itself. However, because of the way in which rubber is now compounded to reduce the time and temperature of curing, the problems of preventing burning or scorching have become increasingly more critical. In the improved machine, these difficulties have been materially minimized by providing, between the point of extrusion and the screw, means which act more positively to push the material toward the die, thus relieving to a considerable extent the back pressure at the delivery end of the screw and thereby reducing the slippage between the material and the screw surfaces with its accompanying generation of frictional heat.

The improved machine also serves as a plasticating, mixing and straining unit. A large investment in the rubber industry is represented by the machines used for these purposes and, while the improved machine does not necessarily eliminate the need for such machines (although conceivably it could), it does reduce to a considerable extent the time required for processing and cleaning the rubber prior to extrusion. In other words, the improved machine results in substantial economies in the processing of rubber and in a speeding up of production.

According to the present improvements, there is provided in the chamber between the forming die and the delivery end of the conveying screw, a perforate partition in the form of a screen or drilled plate, the partition extending transversely of the chamber and arranged at right angles to the axis of the screw. At the end of the screw, so as to rotate therewith, there is provided a member presenting one, two or more impeller or wiper blades extending in a radial direction from the axis of the screw. The blades each present a leading surface disposed so as to form an acute dihedral angle with that portion of the perforate partition over which the blade is about to pass. The blade surfaces terminate in edges disposed in close proximity to the perforate partition, the arrangement being such that, as the blades rotate, the leading surfaces thereof pick up the plastic material delivered by the screw and urge it in the direction of the perforate partition. As the material passes beneath the blade edges, it is pushed through the perforations of the partition and then cut off from the rest of the batch. The relatively positive pushing action of the blades relieves the back pressure upon the screw, whereas the severing of the material already pushed through the perforations of the partition from the oncoming portion of the batch, together with the rotating action of the blades, causes the subsequent material pushed through a given perforation to be from a different portion of the batch. To be more explicit, since there are one or more blades, a severing of the material at any given perforation will occur once or more during each screw rotation and, as the material forced through the perforations after each severance is from a different portion of the batch, the material that has traversed the perforated partition will be thoroughly mixed.

Other features and advantages of the improved machine will be apparent as the description of the invention proceeds.

Referring to the drawings:

Fig. 1 is a side elevation, partly in section, of a portion of an extruding machine equipped with the present improvements;

Fig. 2 is a face view of one form of perforated partition with which the improved machine can be equipped;

Fig. 3 is a face view of one form of device for holding the perforated partition in place;

Fig. 4 is a view in perspective of the impeller or wiper blade;

Fig. 5 is a sectional view on line 5—5 of Fig. 4;

Fig. 6 is a view similar to Fig. 1 but showing a different form of device for holding the perforated partition in place; and Fig. 7 is a view in perspective of the perforated partition holding member with which the extruding machine shown in Fig. 6 is equipped.

The material to be extruded is conveyed from a source (not shown) by a rotating screw A into a chamber B from which it is forced under suitable pressure through a die C for imparting the desired shape to the material, depending upon the product being manufactured (see Fig. 1). The screw (only part of which is shown) is rotatably arranged in a cylindrical passageway $A^1$ provided in the delivery end portion $A^2$ of the extruding machine. The screw is of the usual conveyor type and is supported by the engagement of the outer edges of its convolutions with the walls of the cylindrical passageway $A^1$. The delivery portion $A^2$ of the machine terminates in a flange $A^3$ on which is mounted an extrusion head, formed in part by two annular members D and E, the inner member D being secured by studs $a$ threaded into the rightmost face of the flange $A^3$ and which pass through holes provided for the purpose in the member D around the external periphery thereof. Nuts $A^4$, threaded upon the ends of the studs and screwed up tightly against the member D, secure the extrusion head in place. The outer or end member E of the extrusion head is threaded into the adjacent member D.

Adjacent its outer face, the head member E is internally threaded to receive a die holder F which likewise is internally threaded to receive the die C. The holder F will accommodate dies of different configurations, and, of course, variations in the size of the die can be accommodated by the substitution of different die holders. In the embodiment illustrated, a core $C^1$ is associated with the die, the core being threaded at its inner end into the central or hub portion of a core bridge $C^2$, which has a series of arms (not shown) extending radially outwardly from the hub to a ring integral with said arms and which banks against an annular shoulder $E^1$ presented by the head member E and is held in place by the die holder F. Proper centering of the core with respect to the die is obtained by a series of four set screws $E^2$ equally spaced around the periphery of the head member E and extending radially inward so as to engage the core bridge. The manner of adjusting the core bridge and consequently the core will be apparent from the drawings.

As thus far described and except as hereinafter indicated, the parts are the same as those in a standard extruding machine.

In accordance with the present invention, the chamber B, which is defined by the inner walls of the two annular shaped head members D and E, is divided into two parts by a transverse perforated partition. In the embodiment shown in Fig. 1, the partition comprises a circular screen member G backed up by a stronger circular member $g$ provided with a series of holes $g^1$ drilled through the member in the direction in which the material moves through the machine, the holes being located in the member over the entire active surface thereof that is presented in the path of the moving material. The circular member $g$ presses the fine screen member G up against an annular shoulder $D^1$ presented by the head member D and is itself held in position by the outer head member E, the inner face of the latter pressing directly upon the member $g$ itself. While the perforate member shown is of the screen type, for the purposes of the invention, a drilled plate, grilled element, or any other perforate type of member would suffice.

Also in accordance with the invention, there is provided in that portion of the compartment between the perforate member G and the conveyor screw A, an impeller or wiper blade member H secured to the screw at its delivery end and arranged to rotate therewith. As shown, the blade member is drilled near the center to accommodate two machine screws $H^1$ passing through said blade member and which are threaded into the screw A itself. In order to relieve the shearing stress to which the screws $H^1$ would otherwise be subjected, the blade member is provided with a tongue $H^2$ arranged to seat in a groove formed in the screws at the end thereof. The impeller member shown is formed with two diametrically opposed blade portions, extending radially outwardly from its center, each blade presenting a leading surface $H^3$ disposed so as to form with the portion of the perforate member G in advance of the blade, an acute dihedral angle. In other words, as the impeller member H is rotated by the screw A, the material is caught in said angle and pushed along toward the screen.

The inclined surfaces of the impeller blades terminate in edges $H^4$ disposed parallel with and in close proximity to the plane of the perforate member G (in practice a distance of .002" has been found satisfactory for certain kinds of rubber) and as the blades rotate, these edges sweep across the surface of the perforate member, with the result that the material which is urged forward along the inclined surfaces is positively pushed through the perforations of the member G and then through the holes in the member $g$. This positive action of the impeller blades eliminates to a large degree the back pressure which otherwise would be exerted upon the conveyor screw. Furthermore, the blades, because of the close proximity of their edges to the perforate member, act to shear off the material that has already passed through the screen perforations, thus severing it from the rest of the batch that follows. As the blades continuously impart a rotary movement to the mass in addition to the forward pushing movement, it will be seen that, after every severance at a given perforation, the material next pushed therethrough will be from a different portion of the batch. And, as such action is continuous, occurring as it does at each perforation of the screen twice during each rotation of the screen A, thorough mixing of the batch will result.

During the rotation of the impeller H, the opposed blade portions $H^3$ thereof, at any given instant, move in opposite directions. Consequently, while the inclined surfaces are disposed at the same angle with respect to the perforated member, bearing in mind the direction in which the respective blades travel, nevertheless as between themselves said surfaces are oppositely inclined, with the result that the active edges $H^4$ presented by the respective blades are offset in opposite directions from the longitudinal center line of the impeller member (Figs. 4 and 5). Since it is preferred that the impeller act over the entire surface of the perforate member, said impeller is formed with an intermediate edge portion H$^5$, interconnecting the other two edge portions H$^4$, and disposed in the same vertical plane. For the most part, the interconnecting edge is straight except near its opposite ends where it curves smoothly into the edge portions H$^4$. The surfaces of the impeller fall away from the edge portion H$^5$ and merge smoothly into the oppositely inclined surfaces of the blades. An impeller of this character permits the entire surface of the perforated member to be utilized, thereby enabling the machine to operate at maximum efficiency.

Another feature to be noted is the outward flare D$^2$ of the chamber B in the vicinity of the impeller member H. This permits a larger screen area and also longer impeller blades, so that for any given screw speed a larger quantity of material can be forced through the screen, thus further reducing the back pressure on the screw with a resultant decrease in generated heat and increase in machine capacity. The outer ends of the blades are tapered as at H$^6$ to conform with the flare.

Since heat control is important, there is provided a recess or chamber G$^3$ extending entirely around the circular member $g$. The member $g$ is tapped at the top and at the bottom, as at G$^4$ and G$^5$, for pipe connections by which a steam and water mixture can be circulated through the chamber G$^3$. Holes $d$ may be drilled in the member D through which the pipe connections may be introduced. The circulation of a regulated mixture of steam and water in this manner will permit the head member to be maintained under constant temperature control.

It might also be added that the temperature of the batch, as it progresses through the machine under the action of the conveying screw, can also be regulated in the same manner, i. e., by introducing a steam and water mixture into a jacket (not shown) but which surrounds the conveying screw.

In the embodiment of the invention shown in Figs. 6 and 7, the perforate screen member G is backed up by a coarser and stronger screen G$^1$ welded or otherwise secured to an annular ring member G$^2$ which holds the fine screen member G in position much in the same fashion as the circular ring member $g$ in the embodiment previously described. In other respects this perforate member holding device is the same as the member $g$, i. e., its annular ring portion is provided with a chamber G$^3$ which is tapped as at G$^4$ and G$^5$ for the circulation of a steam and water mixture for temperature regulation. The remaining parts of the extrusion head are the same and have been designated by the same legends as in the embodiment shown in Fig. 1.

The flexibility of the improved machine is such that, depending upon the character of use, economies in different categories may be realized. Thus, in one test with an extruding machine, standard except for the addition of the present improvements, it was found that when the machine was fed compounded rubber at room temperature, it gave the same output volume as would the standard machine (without the improvement) operated at the same stock screw feed but supplied with mill warm stock. The load increase was approximately 15 to 20 per cent but the need for warming mills was eliminated. In a second test with the same improved unit, an increase in production between 75 and 100 per cent was realized when the machine was supplied with mill warm stock, the machine operating at a stock screw speed similar to that in present tubing practice. The load increase in this instance was approximately 10 to 15 per cent. In a third test, the improved machine was supplied with mill warm stock and gave a volume output equal to that of the standard machine but at a stock screw speed substantially below that normally used in regular practice. Here, no increase in load was necessary and the temperature increase between the feed and the extruded stock was less than 15 degrees. In each of the above cases, uniformity of plasticity and gauge, as well as improved dispersion of the compounds resulted.

In the accompanying drawings, the invention has been shown merely by way of example and in preferred form, but obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. In a machine for extruding plastic material, the combination of an enclosure comprising a chamber having an outlet through which plastic material is extruded, and a cylindrical portion which houses a screw conveyor for advancing the material to said chamber, a perforate member between the conveyor and the chamber outlet, and an impeller rotatably mounted in advance of the perforate member for forcing the material therethrough, said enclosure, immediately in advance of the perforate member being larger in cross-sectional area than the portion thereof containing the conveyor screw.

2. An extruding machine according to claim 1, wherein the impeller is operated by the screw conveyor.

3. An extruding machine according to claim 1, wherein the rotatable impeller is provided with blade portions which present each a surface disposed at an acute angle with respect to the perforate member and with the opening of the angle facing in the direction of impeller rotation.

4. An extruding machine according to claim 1, wherein the rotatable impeller is provided with blade portions which present each a surface disposed at an acute angle with respect to the perforate member and with the opening of the angle facing in the direction of impeller rotation, said surface terminating in an edge parallel with and in close spaced relation to the perforate member to enable the material forced through the member to be severed continuously from the remainder of the batch as the impeller rotates.

5. An extruding machine according to claim 1, wherein the impeller is provided with blade portions which present surfaces disposed at acute angles with respect to the perforate member and with the angle openings facing in the direction of impeller rotation, said surfaces terminating in an edge parallel and in close spaced relation with the perforate member and extending continuously from the outer end of one of said blade portions to the outer end of the other.

6. An extruding machine according to claim 1, wherein the impeller is provided with blade means arranged to continue the advance of material delivered to it by the conveyor and acting continuously to sever the material forced through the perforate member from the remainder of the oncoming batch.

7. An extruding machine according to claim 1, wherein the enclosure, in advance of the perforate member, flares outwardly from the portion thereof housing the conveyor toward the periphery of the perforate member.

8. An extruding machine according to claim 1, wherein the enclosure, in advance of the perforate member, flares outwardly from the portion thereof housing the conveyor toward the periphery of the perforate member, said flaring portion of the enclosure containing the impeller whose radial dimensions exceed those of the conveyor screw.

9. An extruding machine according to claim 1, wherein the enclosure, in advance of the perforate member, flares outwardly from the portion thereof housing the conveyor toward the periphery of the perforate member, said flaring portion of the enclosure containing the impeller whose radial dimensions exceed those of the conveyor screw and whose ends are shaped to conform with the flare of said enclosure portion.

JAMES C. CLINEFELTER.